F. G. DUSTIN, O. M. FRYKMAN & A. WATTS.
CLUTCH AND BRAKE MECHANISM.
APPLICATION FILED MAY 19, 1911.
1,119,938.
Patented Dec. 8, 1914.
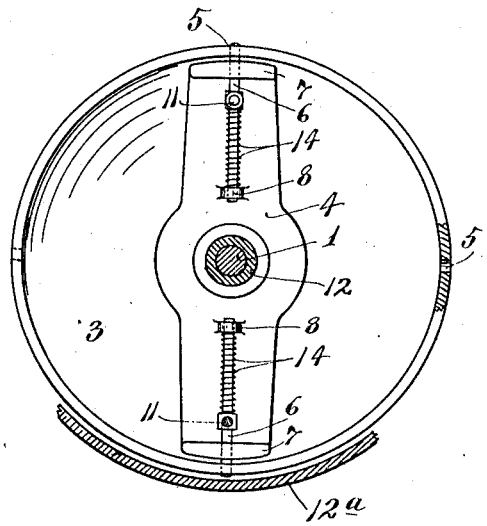
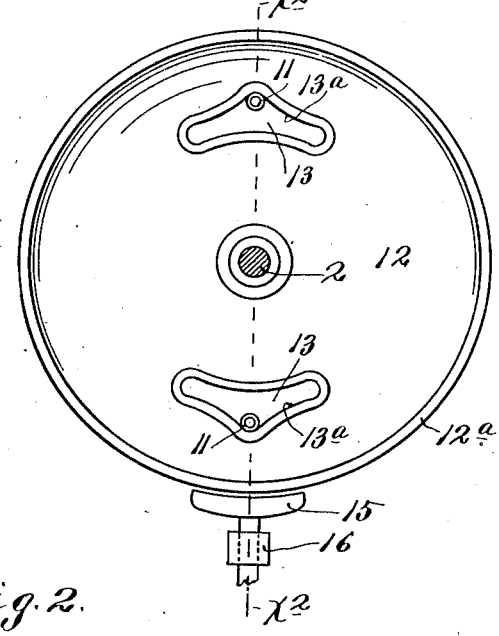
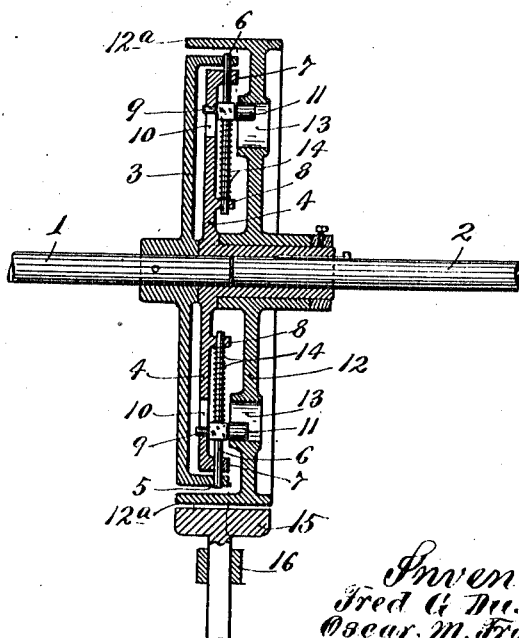
Witnesses.
A. H. Opsahl.
Harvey Hillgren
Inventors
Fred G. Dustin
Oscar M. Frykman
Arthur Watts
By their Attorneys.
Williamson Merchant

UNITED STATES PATENT OFFICE.

FRED G. DUSTIN, OSCAR M. FRYKMAN, AND ARTHUR WATTS, OF MINNEAPOLIS, MINNESOTA.

CLUTCH AND BRAKE MECHANISM.

1,119,938.  Specification of Letters Patent.  Patented Dec. 8, 1914.

Application filed May 19, 1911. Serial No. 628,143.

*To all whom it may concern:*

Be it known that we, FRED G. DUSTIN, OSCAR M. FRYKMAN, and ARTHUR WATTS, citizens of the United States, residing at Minneapolis, in the county of Hennepin and State of Minnesota, have invented certain new and useful Improvements in Clutch and Brake Mechanism; and we do hereby declare the following to be a full, clear, and exact description of the invention, such as will enable others skilled in the art to which it appertains to make and use the same.

This invention has for its object to provide an improved clutch and brake mechanism, and to this end, it consists of the novel devices and combinations of devices hereinafter described and defined in the claims.

In the numerous mechanical organizations, it is highly desirable, in various instances, that a driven shaft or member be uncoupled from a driving shaft or member and suddenly brought to a stop. In certain instances, clutches have been provided for disconnecting a driven shaft from a driving shaft or source of power, and in other instances, brakes have been applied for stopping or retarding the motion of a driven member without disconnecting the same from a driving shaft or source of power.

This invention provides a novel coöperative organization of a brake and clutch, whereby, approximately simultaneously, a brake is applied to stop or arrest the movement of the driven member or shaft and the driving shaft or source of power is uncoupled from the driven member so that it will not exert a driving power thereon when the brake is set. A device of this kind is capable of a very great many different uses, impossible to enumerate in full, but among which, the following important uses may be mentioned, to-wit, an emergency brake and clutch for automobiles, where, when the emergency brake is set, the engine will be thrown out of its driving action while it still runs; an emergency or safety coupling for line shafts in factories or elsewhere, by the use of which, in the case of an accident, for instance, a certain shaft, or section thereof, may be quickly stopped; for starting and stopping various individual power driven machines such as sewing machines, for example; and an emergency brake for elevators.

In the accompanying drawings, which illustrate the improved clutch and brake mechanism, like characters indicate like parts throughout the several views.

Referring to the drawings, Figure 1 is a side elevation of the improved clutch and brake mechanism; Fig. 2 is a section taken on the line $x^2$ $x^2$ of Fig. 1; and Fig. 3 is an elevation showing the clutch and brake mechanism with the so-called brake wheel removed.

The numeral 1 indicates a driving member which may be assumed to be an engine shaft or a shaft positively driven from an engine or motor.

The numeral 2 indicates a driven member in the form of a shaft which is axially alined with the shaft 1.

The driving element of the clutch and brake mechanism proper is shown as in the form of a disk-like wheel 3, having its hub secured to the driving shaft 1 by a cam, key, or other means.

The numeral 4 indicates the driven element of a clutch which is shown in the form of a diametrically extended plate-like arm having a long hub that is keyed, or otherwise rigidly secured to the driven shaft or member 2. The wheel 3 is provided with a laterally projecting peripheral flange which, as shown, is formed with a multiplicity of radial plunger seats 5 that are adapted to be engaged by the outer ends of clutch plungers 6 mounted for radial movements in the bearing lugs 7 and 8 on the arms 4. To hold the clutch plungers 6 against rotation on their own axes, they are shown as provided with short projecting studs 9 that work in radial slots 10 of the arm 4. One or more of these clutch plungers 6 may be employed, but as shown, two are used, and each is provided with outwardly projecting, preferably, roller equipped studs 11. The slots 10 in the arm 4 are long enough to permit the clutch plungers 6 to be moved into engagement and entirely out of engagement with the plunger seats 5 of the wheel 3. Obviously, when the plungers 6 are engaged with the seats 5 of the wheel 3, the driving and driven shafts or members 1 and 2, are positively connected for common rotation. So far as the broad idea of the invention is concerned, a friction clutch instead of a positively acting clutch might be employed to connect the driving and driven members.

A brake member in the form of a wheel 12 is, as shown, journaled on the hub of the arm or driven element 4 of the clutch. The web of the brake wheel 12 is provided with diametrically opposite segmental slots or cam channels 13 in which the studs 11 of the clutch plungers 6 are arranged to work. The outer surfaces of these slots 13 are formed of inwardly diverging cam surfaces 13$^a$ with which the plunger studs 11 are held engaged by coiled springs 14 that re-act against the bearing lugs 8 and against the said plungers with a force tending to move the same outward. Normally, or when no friction is applied to interfere with the rotation of the brake 12, the said wheel will be held in an intermediate position in respect to the driven clutch element arm 4, and the said clutch wheel will simply be given a rotation that is common to that of said arm and of the driven shaft 2.

The brake wheel 12 is, as shown, formed with a cylindrical peripheral flange 12$^a$ with which a brake shoe, brake band, or other brake element is adapted to coöperate and which, as shown, is in the form of a brake shoe 15 mounted to move through suitable fixed guides 16 into and out of engagement with the said brake wheel 12.

The operation of this improved device is substantially as follows: Normally, the brake shoe 15 will be out of engagement with the brake wheel 12 and the driving and driven elements 3 and 4 of the clutch are locked together by the clutch plungers or bolts 6, so that the driving and driven members or the shafts 1 and 2 will be given common rotation. When it is desired to stop the rotation of the shaft or member 2, it is only necessary to force the brake shoe 15 into engagement with the peripheral face of the brake wheel 12 so as to arrest the movement thereof, sufficiently to cause the studs 11 of the clutch plungers 6 to run to the extremity of one of the cam surfaces 13$^a$. This will disengage the clutch plungers 6 from the driving wheel or clutch element 3, and hence, entirely free or release the driven shaft 2 from the driving shaft 1. Thus it will be seen that simultaneously, or approximately so, a brake is set to stop the rotation of the driven shaft or member, and the latter is uncoupled from the driving member or source of power. This prevents the source of power, such as an engine or motor, from operating against the set brake. The uncoupling of the driving and driven members and setting of the brakes is accomplished instantly and without making it necessary to stop the movement of the driving member or source of power. The force with which the brake will be set, will, of course, depend upon the pressure under which it is forced against the brake wheel 12. The said brake wheel 12 has, as is evident, only a limited rotary motion in respect to the driven clutch element 4 and driven shaft or member 2, and hence, when the studs 11 reach the limits of the slots 13, the said driven clutch element and driven shaft cannot run ahead of the brake wheel and their motion must be arrested or stopped with that of the said brake wheel. As soon as the brake shoe 15 is disengaged from the brake wheel 12, the springs 14, pressing the studs 11 against the cam surfaces 13$^a$ cause the brake wheel to again assume its intermediate position in respect to the driven clutch element 4 and shaft 2. At their central portions, the slots 13 have such radial dimensions that the proper radial movements of the clutch plungers 6 are not interfered with. If, when the clutch wheel 12 is first released, the outer ends of the clutch plungers 6 do not instantly aline with the plunger seats 5, they will at least do so before the driving clutch element 1 has made more than a half rotation and when they do come into alinement with these seats 5, all of the parts of the combined clutch or brake mechanism will then be restored to their normal relative position shown in the drawings, and in which the brake is released and the driving and driven members are coupled together.

What we claim is:

1. The combination with driving and driven members having coöperating clutch elements, certain of the clutch elements of said driven member being yieldingly pressed into action, of a brake element having only a limited rotation in respect to said driven member and provided with a cam surface permitting the engagement between the yieldingly pressed clutch element of said driven member and the coöperating clutch element of said driving member, when said brake element is loose and free for rotation, but operative to retract the yieldingly pressed clutch element of said driven member, whenever rotation of said brake element is retarded.

2. The combination with driving and driven members having coöperating clutch elements, certain of the clutch elements of said driven member being yieldingly pressed radially outward, of a wheel, having only a limited rotation in respect to the driven member and provided with reversely acting cam surfaces permitting engagement between the yieldingly pressed clutch elemen of said driven member and the coöperating clutch element of said driving member when said wheel is loose and free for rotation with said driving member, but operative to retract the yieldingly pressed clutch element of said driven member, whenever rotation of said wheel is retarded with respect to said driving member.

In testimony whereof we affix our signatures in presence of two witnesses.

FRED G. DUSTIN.
OSCAR M. FRYKMAN.
ARTHUR WATTS.

Witnesses:
BERNICE G. WHEELER,
HARRY D. KILGORE.